United States Patent Office 3,360,506
Patented Dec. 26, 1967

3,360,506
SPECIFIC N-VINYL-2-IMIDAZOLINES
Peter L. De Benneville, Philadelphia, and Lawrence J. Exner, Cheltenham, Pa., assignors to Rohm & Haas Company, Phildelphia, Pa., a corporation of Delaware
No Drawing. Filed Feb. 8, 1963, Ser. No. 257,070
1 Claim. (Cl. 260—78.5)

This case deals with specific N-vinyl-2-imidazolines as new compositions of matter. It further deals with a method for producing these specific N-vinyl-2-imidazolines. It also deals with polymers of the aforementioned specific N-vinyl-2-imidazolines.

The specific N-vinyl-2-imidazolines of the present invention may be represented by the formula

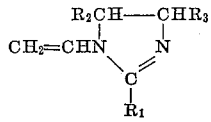

wherein $R_1$ is alkyl, including cycloalkyl of up to 18 carbon atoms, aryl of 6 to 10 carbon atoms, and aralkyl, alkylarylalkyl and alkylaryl of 7 to 20 carbon atoms, $R_2$ and $R_3$, individually, are hydrogen or alkyl of 1 to 17 carbon atoms, and collectively with the carbon atoms to which they are attached form a saturated aliphatic ring of 5 to 6 carbon atoms which may also contain alkyl substituents of a total of up to 8 additional carbon atoms. $R_1$ may typically be methyl, ethyl, butyl, octyl, octadecyl, phenyl, chlorophenyl, methoxyphenyl, methylphenyl, naphthyl, benzyl, phenylbutyl, butylphenylbutyl, octylbenzyl, butylphenyl, dibutylphenyl, and dodecylphenyl. $R_2$ and $R_3$ individually may represent hydrogen, methyl, ethyl, butyl, hexyl, octyl, dodecyl or octadecyl. Collectively, $R_2$ and $R_3$ may typically represent, with the carbon atoms to which they are attached, pentamethylene or hexamethylene rings which may have methyl, ethyl, butyl, dimethyl or diethyl attached thereto.

The compounds of the present invention are made by reacting a diamine having the formula

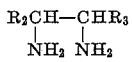

with a carboxylic acid having the formula $R_1COOH$, or with a derivative thereof. A particularly useful method comprises reacting a nitrile, $R_1CN$, with the diamine, in the presence of hydrogen sulfide or thioacetamide. The resulting imidazoline is then reacted with acetylene in the presence of a strongly basic vinylation catalyst to form the desired N-vinyl-2-imidazoline.

The vinylation of the 2-imidazoline may be conducted at atmospheric or superatmospheric pressures, such as up to about 2,000 pounds per square inch, and according to batch or continuous techniques. It may be conducted in the presence or absence of a solvent although generally a solvent is preferred, particularly if the vinylation is conducted at superatmospheric pressures. Suitable solvents are those that are inert and organic such as dimethylformamide, n-methylpyrrolidinone, dimethyl sulfoxide, isopropanol, tetrahydrofuran, dioxane and the like. Temperatures in the range of about 100° C. to about 250° C. are employed, preferably 130° to 220° C.

The acetylene and 2-imidazoline are reacted in the presence of a strongly basic vinylation catalyst such as, the alkali metals, their hydroxides and alkoxides. Typical in this respect are sodium, potassium, sodium methoxide, sodium butoxide, sodium hydroxide, potassium ethoxide, potassium methoxide and potassium hydroxide. Preferred embodiments include potassium hydroxide, sodium hydroxide, sodium methoxide and potassium methoxide. The vinylation is preferably carried out by introducing acetylene, preferably in a solvent, to a selected 2-imidazoline in liquid or molten condition or more desirably also in a solvent, until the desired vinylation is consummated. At the conclusion of the reaction the 1-vinyl-2-imidazoline is isolated by distillation techniques as will be more apparent hereinafter.

The N-vinyl-2-imidazolines described hereinabove can be homopolymerized or copolymerized with ethylenically unsaturated polymerizable monomers.

Suitable as comonomers are alkyl and aryl acrylates in which the alkyl or aryl portion contains preferably one to eighteen carbon atoms; alkyl and aryl methacrylates in which the alkyl or aryl portion contains preferably one to eighteen carbon atoms; vinylidene cyanide; acrylonitrile; methacrylonitrile; alkylaminoalkyl and dialkylaminoalkyl acrylates and methacrylates; acrylamide and methacrylamide, and their N-alkyl substituted derivatives; styrene and alkyl ring substituted styrenes containing no more than a total of about 20 carbon atoms; α-methylstyrene; divinylbenzene and alkyl-substituted divinyl benzenes; trivinylbenzene and alkyl-substituted trivinylbenzenes; vinyl esters, in which the carboxylate portion contains one to eighteen carbon atoms, including the carbon of the carboxylate functions; vinyl alkyl ethers and vinyl alkyl sulfides in which the alkyl portion contains no more than 18 carbon atoms and N-vinyl lactams preferably containing from 6 to 20 carbon atoms; alkyl vinyl sulfones in which the alkyl portion contains up to about 18 carbon atoms; N-vinylalkyleneureas containing from 5 to 12 carbon atoms; olefins such as isobutylene, butadiene and isoprene; dialkyl fumarates of up to 24 carbon atoms; dialkyl maleates of up to 24 carbon atoms; and dialkyl itaconates of up to 24 carbon atoms; and vinylpyridines. In the above monomers, the alkyl groups may exhibit any possible spatial configuration such as normal, iso, or tertiary. These alkyl groups may be acyclic or cyclic, including alkyl-substituted cyclic, as long as the total carbon content conforms to the defined amount. In the ring substituted styrenes the substituents may occupy any possible ring location or locations and when the substituents are alkyl groups, they may have any possible spatial configuration.

Typical of the above monomers that may be employed are methyl acrylate, isopropyl acrylate, cyclopentyl acrylate, 2-ethylhexyl acrylate, decyl acrylate, dodecyl acrylate, octadecyl acrylate, methyl methacrylate, t-butyl methacrylate, cyclohexyl methacrylate, octyl methacrylate, undecyl methacrylate, phenyl methacrylate, vinyl methacrylate, dimethylaminoethyl methacrylate, methoxyethoxyethyl methacrylate, t-butylaminoethyl methacrylate, t-dodecylaminoethyl acrylate, octadecyl methacrylate, acrylonitrile, methacrylonitrile, vinylidene cyanide, N,N-dibutyl acrylamide, acrylamide, N-methylacrylamide, N-t-octylacrylamide, styrene, p-butylstyrene, p-octylstyrene, o-chlorostyrene, o,p-dipropylstyrene, p-cyanostyrene, o-methyl-p-decylstyrene, 1,4-divinylbenzene, sym.-trivinylbenzene, formamidoethyl vinyl ether, butanamidodecyl vinyl ether, acetamidooctadecyl vinyl ether, ureidoethyl vinyl ether, butyl vinyl sulfide, octyl vinyl sulfide, octadecyl vinyl sulfide, hydroxyethyl vinyl sulfide, dimethylaminoethyl vinyl sulfide, diethylaminodecyl vinyl sulfide, morpholinopentyl vinyl sulfide, pyrrolidinyloctyl vinyl sulfide, piperidinodecyl vinyl sulfide, N-vinyl-2-pyrrolidinone, N-vinyl-5-methyl-2-pyrrolidinone, N-vinyl-4,4-dimethyl-2-pyrrolidinone, N-vinyl-4-butyl-5-octyl-2-pyrrolidinone, N-vinyl-6-methyl-2-piperidone, N-vinyl-6-octyl-2-piperidone, N-vinyl-2,2,6,6-tetramethyl-4-piperidone, N-vinyl-2-oxohexamethylenimine, N-vinyl-5,5-dimethyl-2-oxohexamethylenimine, N-vinyl-4-butyl-5-octyl-2-oxohexamethylenimine, methyl vinyl sulfone, isobutyl vinyl sulfone, t-octyl vinyl sulfone, dodecyl vinyl sulfone, octadecyl vinyl sulfone, divinyl sulfone, N-vinylethyleneurea, N-vinyltrimethyleneurea, N-vinyl-1,2-propyleneurea N-vinylbutyleneurea, N-vinyl-N'-dibutylaminododecylethyleneurea, butadiene, isoprene, N-vinylcarbazole, vinyl acetate, vinyl stearate, dimethyl maleate, dioctyl maleate, dimethyl itaconate, dibutyl itaconate, dihexyl itaconate, dimethyl fumarate, diethyl fumarate, dioctyl fumarate, dibutyl fumarate, didodecyl fumarate, dibutyl maleate, dihexyl maleate, didecyl maleate, diethyl itaconate, dioctyl itaconate, didodecyl itaconate, and 2-vinyl-5-methylpyridine.

It is understood that, in many cases, it will be preferred to combine more than one of the above comonomers with the specific imidazolines of this invention, as for example, methyl methacrylate and styrene, in order to achieve various modifications and properties of the product contemplated.

Polymerization may be carried out in bulk when the monomers are liquids or low-melting solids, in solution, or in either suspension or emulsion. In bulk and solution polymerization, it is preferred to use one or more of the peroxide or azo initiators which act as free radical catalysts, and are effective between 30° C. and 150° C. These may be employed in amounts of 0.01 to 10% or more by weight, preferably 0.01 to 1% by weight. Typical initiators include benzoyl peroxide, t-butyl peroxide, acetyl peroxide, capryl peroxide, t-butyl hydroperoxide, cumene hydroperoxide, t-butyl perbenzoate, methylethyl ketone peroxide, azodiisobutyronitrile, azodiisobutyramide, dimethyl, diethyl, or dibutyl azodiisobutyrate, azobis($\alpha,\beta$-dimethylvaleronitrile), azobis($\alpha$ - methylbutyronitrile), azobis($\alpha$-methylvaleronitrile), dimethyl or diethyl azobis-$\alpha$-methylvalerate, and the like.

In conjunction with a hydroperoxide it is desirable, but not absolutely essential, to supply an activator. Its effect seems at least in part to provide free radicals at somewhat lower temperatures than are effective for free radical formation from hydroperoxides in the absence of such activator.

Especially effective as activators are quaternary ammonium compounds. Typical compounds of this sort are benzyltrimethylammonium chloride,
dibenzyldimethylammonium bromide,
butyldimethylbenzylammonium chloride,
octyltrimethylammonium chloride,
dodecyldimethylbenzylammonium chloride,
nonylbenzyltrimethylammonium chloride,
dodecylbenzyldimethylbenzylammonium chloride,
didodecenyldimethylammonium chloride,
benzyldimethyldodecenylammonium chloride,
octylphenoxyethyldimethylbenzylammonium chloride,
diisobutylphenoxyethoxyethyldimethylbenzylammonium chloride,
octylpyridinium chloride,
N-octyl-N-methyl-morpholinium chloride, or bis-quaternary salts, such as those having quaternary nitrogens linked with an alkylene group, an ether group, or an amide-containing group.

The amount of activator is proportioned to the amount of hydroperoxide. Usually, the proportion of quaternary ammonium compound will be from 5% to 40% of the weight of the hydroperoxide.

Solution polymerization may be carried out in water, benzene, toluene, xylene, solvent naphthas, dioxane, diisobutyl ketone, acetonitrile, dimethyl formamide, tert-butyl alcohol and the like, depending on the solubilities of the monomers it is desired to use.

Emulsion polymerization is particularly effective with those members of the subject vinyl imidazolines which have low solubilities in water. There may be used in forming the emulsion, non-ionic or cationic emulsifiers such as dodecyldimethylbenzylammonium chloride, dodecylbenzyltrimethylammonium chloride, cetylpyridinium chloride, alkylphenoxypolyethoxyethanols having alkyl groups of about 7 to 18 carbon atoms and 6 to 60 or more oxyethylene units, such as heptylphenoxypolyethoxyethanols,
octylphenoxypolyethoxyethanols,
methyloctylphenoxypolyethoxyethanols,
nonylphenoxypolyethoxyethanols,
dodecylphenoxypolyethoxyethanols and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like; mercaptans or with alkylthiophenols having alkyl groups of 6 to 15 carbon atoms; ethylene oxide derivatives of long-chained carboxylic acids, such as lauric, myristic, palmitic, oleic, and the like, or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide, and the like, or an inorganic peroxide, such as hydrogen peroxide, ammonium persulfate, sodium persulfate, potassium persulfate, or the like. The peroxidic catalyst is effectively coupled with a reducing agent, such as a sulfite, bisulfite, metasulfite, or hydrosulfite or ammonium, sodium potassium, or the like.

Polymerization may also be initiated by high-energy irradiation. Suitable sources of high energy-irradiation are radioactive materials and electron accelerators. Useful as radioactive materials that supply gamma rays are irradiated isotopes such as $Co^{60}$, fission product such as $Cs^{137}$, adjuncts to fission reactants such as radioactive xenon, and the like. A $Co^{60}$ source is particularly effective. Useful as radioactive materials that supply beta rays are $Sr^{90}$, and the like. Valuable as electron accelerators, which supply beta rays, are the Van de Graaff generator, the resonant transformer, and the like. Dosages in the range of 10,000 to 10,000,000 R.E.P.'s, preferably 500,000 to 2,000,000 R.E.P's, are employed. A R.E.P. is equivalent to the ionization produced by the absorption of 93 ergs of energy per gram of irradiated substance. R.E.P. stands for roentgen-equivalent-physical and is a unit of intensity and time.

Preferred comonomers include methyl methacrylate, acrylonitrile, ethyl acrylate, acrylamide, styrene, diethyl fumarate, and vinyl acetate.

The copolymers of the present invention are useful as thickening agents for starch-water mixtures which are to be applied to paper or cloth. They are useful as additives for gasoline in which they are effective stabilizers in preventing gum formation and also exhibit valuable anti-rust activity. The present copolymers are useful as oil additives, particularly as pour point depressants, viscosity improvers, and anti-rust, anti-wear, and sludge dispersant agents. Many of the present copolymers are useful in the preparation of fibers which exhibit excellent acid dye adsorption. The copolymers of the present invention may also be used in coating formulations to provide tough transparent adhesive coatings, with good color stability at baking temperatures. Some copolymers are also effective as aggregants for soils and glossing agents for leather. The copolymers may often be extruded, molded, or cast in any desired form to provide architectural signs, ornaments and structures.

The copolymers of the present invention may be prepared in a wide range of percentages of molecular units. The valuable properties described hereinbefore are observed when as little as 0.5% by weight of the specific imidazolines of this invention are employed. It is generally preferable to use about 2% or more of this monomer. As an upper limit there is preferably employed about 50% of imidazoline monomer.

Homopolymers of the present invention vary in characteristics from viscous oils to high-melting solids depending on the structural features of the monomer and on the degree of polymerization. Lower members of the series of N-vinyl-2-imidazolines, wherein the total of $R_1$, $R_2$ and $R_3$ does not exceed 3 carbon atoms, furnish water-soluble homopolymers which are useful as corrosion inhibitors in acid picking baths, as dye assistants, and in the treatment of paper and cloth, and the like. The higher members show excellent solubility in lubricating oils, to which they impart stabilizing properties. Acid salts of the homopolymers are useful thickening agents when used in combination with polmeric latexes.

The vinylimidazolines of the present invention, as well as the polymers thereof, may be more fully understood from the following examples which are offered by way of illustration and not by way of limitation. Parts by weight are used throughout.

*Example 1*

A mixture is made of 120 parts of ethylenediamine, 82 parts of acetonitrile and one part of thioacetamide and it is heated under a reflux condenser. At 82° C. evolution of ammonia starts. The temperature is gradually raised and through most of the reaction is at 94° to 117° C. One part of thioacetamide is added when the reaction slows down. The temperature is then raised to about 153° C. by which time substantially a theoretical amount of ammonia evolves. The product is cooled and recrystallized from ethyl acetate to yield 143 parts of 2-methyl-2-imidazoline, melting point 102° to 104° C., neutral equivalent—85.2.

*Example 2*

A mixture is made of 1030 parts of benzonitrile, 604 parts of ethylenediamine and 8 parts of thioacetamide. The mixture is heated under a reflux condenser with ammonia being evolved at about 55° C. The temperature is gradually raised and at the end reached 200° C. The evolution of ammonia practically ceases and the reaction mixture is cooled to yield 1455 parts of crude 2-phenyl-2-imidazoline. When recrystallized from ethyl acetate, the crystals melt at 99.5° to 101.5° C., have a neutral equivalent—146.3.

In a similar fashion, 530 parts of stearonitrile, 20 parts of ethylene diamine and one part of thioacetamide are heated. As the reaction slows down, one additional part of thioacetamide is added. A total of about four additional parts of thioacetamide are needed before reaction is completed; a final temperature of 265° C. is reached. The product is crystallized from hexane to give 482 parts of 2-heptadecyl-2-imidazoline, melting at about 91° C., neutral equivalent about 310.

*Example 3*

2-phenyl-2-imidazoline (621 parts) is charged to a reactor fitted with a thermometer, stirrer, gas dispersion tube and condenser. Flake potassium hydroxide (24 parts) is added and the mixture is heated under a nitrogen atmosphere. When the temperature reaches 67° C. the flow of acetylene is started. Gas absorption begins at about 110° C. The temperature is regulated at 138–158° C. and gas absorption is continued for six hours. The reaction mixture gains 80 parts by weight. The reactor is arranged for flash distillation under reduced pressure. A mixture of starting material and products (601 parts) accumulates in the receiver at a head temperature below 130° C. (0.2 mm.) and pot temperature below 165° C. A residue (77.5 parts) remains in the reactor. Fractionation of the flash distillate gives 2-phenyl-1-vinyl-2-imidazoline, boiling point 90° C. (0.15 mm.) (522 parts). The product crystallizes upon cooling. Redistillation gives the purified product, melting point 60–62.5° C.

*Analysis.* — Calculated for $C_{11}H_{12}N_2$: C=76.7%; H=7.0%; N=16.3%; Neutral Equivalent=172.2. Found: C=77.0%; H=7.2%; N=16.4%; Neutral Equivalent=172.5.

Upon treatment of the residues from the flash distillation and from the fractionation with water (250 parts) and ether (900 parts), removal of the aqueous phase and evaporation of the organic solvent, starting material (102 parts) is recovered.

In a similar fashion, 2-p-tolyl-2-imidazoline gives 2-p-tolyl-1-vinyl-2-imidazoline, 2-p-methoxyphenyl-2-imidazoline gives 2-p-methoxyphenyl-1-vinyl-2-imidazoline, 2-m-chlorophenyl - 2 - imidazoline gives 2-m-chlorophenyl-1-vinyl-2-imidazoline, and 2-α-naphthyl-2-imidazoline gives 2-α-naphthyl-1-vinyl-2-imidazoline.

*Example 4*

To the reactor described in Example 1 are charged 2-methyl-2-imidazoline (748 parts) and potassium hydroxide (50 parts). The reaction mixture is heated to 100° C. under a nitrogen atmosphere. The acetylene flow is started and absorption of gas begins. Introduction of acetylene is continued for 5.5 hours at 120–150° C. A weight gain of 209 parts is observed and corresponds to 90% conversion of the starting material to 2-methyl-1-vinyl-2-imidazoline. Upon flash distillation, 785 parts of distillate and 211 parts of residue are obtained. On cooling to room temperature, starting material (37.5 parts) crystallizes from the distillate and is separated by filtration. Careful fractionation of the filtrate gives the purified product, 700 parts, boiling point 74° C. (13 mm.), $n_D^{25}=1.5300$.

*Analysis.* — Calculated for $C_6H_{10}N_2$: C=65.4%; H=9.2%; N=25.4%; Neutral Equivalent=110. Found: C=65.7%; H=9.9%; N=24.7%; Neutral Equivalent=110.

The residue from the fractionation (20 parts) crystallizes upon cooling and is found to be virtually pure starting material. Upon treatment of the residue from the flash distillation with water and continuous extraction with ether, additional amounts of starting material (100 parts) and product (50 parts) can be recovered.

In a similar fashion, 2-ethyl-2-imidazoline gives 2-ethyl-1-vinyl-2-imidazoline, 2-hexyl-2-imidazoline gives 2-hexyl-1-vinyl-2-imidazoline, 2-heptadecyl-2-imidazoline gives 2-heptadecyl-1-vinyl-2-imidazoline, 2-cyclohexyl-2-imidazoimidazoline gives 2-octyl-1-vinyl-2-imidazoline, 2-benzyl-2-imidazoline gives 2-benzyl-1-vinyl-2-imidazoline, and 2-cyclohexenyl-2-imidazoline gives 2-cyclohexenyl-1-vinyl-2-imidazoline.

*Example 5*

To a magnetically agitated reactor is charged in solution of 2-phenyl-2-imidazoline (29 parts) and sodium methylate (1 part) in isopropyl alcohol (100 parts by volume). The reactor is sealed, flushed with nitrogen and with acetylene at 200 p.s.i.g. The mixture is then pressurized with acetylene at 50 p.s.i.g. and heating and stirring are started. The temperature is allowed to rise to 145–160° C. in which range rapid absorption of acetylene is observed. From time to time the pressure is increased to 500 p.s.i.g. from the compressor supply. In the course of 4.7 hours, 70% of the total acetylene absorption occurs. During the ensuing 7 hours, the remaining 30% of the gas is absorbed. The reactor is cooled, the remaining gas is vented and the liquid reactant contents are discharged.

A gain in weight of 20 parts is observed. The reaction mixture is then subjected to flash distillation, vinyl isopropyl ether (84 parts) is obtained in the forerun. The product is obtained in the range 60–118° C. (0.25 mm.) (20.6 parts) and the residue of 16 parts is also observed. Refractionation gives the pure product, 2-phenyl-1-vinyl-2-imidazoline, boiling point 102° C. (0.2 mm.). The product crystallizes upon cooling and has a melting point 60.5–63° C.

Example 6

To the reactor described in Example 3 is charged a solution of 2-methyl-2-imidazoline (49 parts) and sodium methylate (3.2 parts) in isopropyl alcohol (100 parts by volume). The reaction with acetylene is carried out at 143–160° C. at 200–500 p.s.i.g. in the course of 3 hours. The reactor is cooled and vented and the weight gain is found to be 5.7 parts. Flash distillation gives isopropyl vinyl ether (113 parts) and the crude product, 2-methyl-1-vinyl-2-imidazoline, boiling point 55–70° C. (0.5 mm.), 48.3 parts. A residue of 10.6 parts remains in the distillation flask. A solid material (7.1 parts) remains in the distillation head and is identified as the starting material, 2-methyl-2-imidazoline by its melting point, 94–95° C. Fractionation of the crude product gives the pure material (20.3 parts), boiling point 47° C. (0.3 mm.) $n_D^{25}$=1.5299.

Example 7

Benzonitrile (105 parts), ethylenediamine (61 parts of 99% pure material) and thioacetamide (0.5 parts) are mixed and heated under reflux. Gas evolution begins at 78° C., the mixture becomes light green in color and the temperature is allowed to rise to 196° C. in the course of 8 hours. A loss in weight of 14.1 parts is observed, at which point gas evolution ceases. To the reaction mixture is added potassium hydroxide (5.6 parts) and the temperature of the reaction mixture is maintained at 136–153° C. while acetylene is passed into the stirred mixture. Acetylene absorption ceases after 6 hours and a weight gain of 31.6 parts is observed. The mixture is poured into 50 parts of water and 150 parts of ether, the aqueous layer is separated and the organic layer is rewashed with water. The combined water layers are rewashed with ether and the combined ether layers are evaporated to remove the solvent. The crude residue (165 parts) is distilled under reduced pressure to give 2-phenyl-1-vinyl-2-imidazoline, in 60% conversion based upon benzonitrile which had been charged initially. From the residue 2-phenyl-2-imidazoline is recovered for recycle.

Example 8

Acetonitrile (61.5 parts), ethylenediamine (90 parts) and thioacetamide (1 part) are heated under an efficient ice water-cooled condenser with stirring. Gas evolution begins when the temperature of the pot reaches 68° C. After 3 hours the pot temperature has reached 99° C. and thioacetamide (1 part) is added. Refluxing is continued until the gas evolution ceases and the temperature has risen to 130° C. This step requires 5 hours. Titration of the evolved gas shows that an amount of base, equivalent to 23.5 parts of NH$_3$ is lost in the course of the reaction. The reaction mixture is arranged for distillation under reduced pressure and the pot is stripped to a temperature of 100° C. (25 mm.). Upon cooling, the entire reaction mass becomes crystalline. The reactor is fitted with a gas dispersion tube and potassium hydroxide (8.4 parts) is added. Stirring is started at 98° C., when a major part of the reaction mixture becomes liquid. The flow of acetylene is started at 150° C. and gas is passed into the reaction mixture for 4 hours while the temperature is maintained in the range 149–169° C. A gain in weight of 36.3 parts is observed. Water (10 parts) is added with stirring. There is no separation of the water layer. Concentrated sulfuric acid (7.4 parts) is added dropwise with stirring at 1° C. Some solid is observed to be dispersed throughout the reaction mixture. It is recovered by filtration and the filtrate (156.5 parts) is flash distilled under reduced pressure. Fractionation of the distillate gives 2-methyl-1-vinyl-2-imidazoline in 75% conversion based upon the acetonitrile which was charged. From the residue is obtained 2-methyl-2-imidazoline which is recycled to a subsequent run.

The N-vinyl-2-imidazolines of this invention are useful fungicides. They are particularly effective against *Stemphylium sarcinaeforme*, *Alternaria solani* and *Monilinia fructicola* when applied according to standard techniques. Effect amounts range from 5 to 100 p.p.m., preferably 10 to 50 p.p.m.

Example 9

A mixture is made of 10 parts of 2-phenyl-1-vinyl-2-imidazoline, 10 parts of methyl methacrylate and 0.02 part of azodiisobutyronitrile. It is heated at 70° C., for 17 hours. A clear, light yellow polymer is obtained. It is dissolved in acetone, and precipitated from hexane. There is obtained 12 parts of a white polymeric solid, soluble in dilute hydrochloric acid. By solution in standard acid and back-titration, a neutral equivalent of 453 is obtained for the polymer.

Example 10

In the same way from 10 parts of 2-methyl-1-vinyl-2-imidazoline, 10 parts of methyl methacrylate and 0.02 part of azodiisobutyronitrile, there is obtained 14.5 parts of a colorless solid polymer, which has a neutral equivalent of 305.

Example 11

A mixture is made of 12 parts of methyl methacrylate, 7 parts of ethyl acrylate, 1 part of 2-methyl-1-vinyl-2-imidazoline and 13.3 parts of toluene. It is heated under a reflux condenser to 80° C., with a slow flow of nitrogen over the surface. At 80° C. there is added 0.04 part of azodiisobutyronitrile, and the reaction is held at that temperature. At 2, 4 and 6 hours an additional 0.02 part of azodiisobutyronitrile is added. At the end of 4 hours there is added 16.66 parts of toluene. After 8 hours there is obtained a viscous solution polymer suitable for use in protective and decorative coatings. When the polymer is precipitated from hexane, there is obtained 19.2 parts of solid polymer having a neutral equivalent of about 2500, and containing by analysis 60.4% C, 8.1% H, and 1.2% N.

Example 12

In a similar manner, from one part of 2-phenyl-1-vinyl-2-imidazoline, 12 parts of methyl methacrylate and 7 parts of ethyl acrylate, there is obtained 17 parts of a solid polymer, which contained by analysis, 61.1% C, 8.3% H, and 0.77% N. Solutions of the polymer in common solvents, such as toluene, butanol, methyl ethyl ketone, Cellosolve acetate and the like, may be used to deposit clear, colorless films, which show very little darkening, even with a drastic overbake. The films also show unusual air-dried adhesion, in comparison with similar films prepared from methyl methacrylate and ethyl acrylate alone in these proportions.

Example 13

To 10 parts of 2-methyl-1-vinyl-2-imidazoline is added 0.05 part of azodiisobutyronitrile. The mixture is heated at 60° C., for three days, under nitrogen. The mixture becomes very thick. Hexane is added and solid polymer precipitates. After drying, there is obtained 4.6 parts of this polymer, which has a molecular weight of about 1100. It is soluble in water, and has a neutral equivalent of about 120.

Example 14

A mixture of 20 parts of 2-phenyl-1-vinyl-2-imidazoline, 20 parts of methyl methacrylate and 0.04 part of benzoyl peroxide is heated under nitrogen for twenty-three hours. The very thick polymer mixture is dissolved in 160 parts of acetone, and the solution is added to 1400 parts of diethyl ether. The white polymer which is precipitated has a neutral equivalent of 446, corresponding closely with the polymer of Example 9, in which azodiisobutyronitrile is used as an initiator.

The polymer, when exactly neutralized with mineral acids, such as hydrochloric, sulfuric and phosphoric acids, gives a viscous solution which is useful as a thickener in application of dye solutions to textile fabrics.

Example 15

To 193 parts of freshly-boiled deionized water, which is held under a stream of nitrogen, is added 8 parts of octlyphenoxypoylethoxyethanol, molecular weight 2000, and 0.25 part of dioctyl sodium sulfosuccinate. To the solution is added, with stirring, a mixture of 95 parts of methyl methacrylate and 5 parts of 2-methyl-1-vinyl-2-imidazoline. When the mixture is well emulsified, there is added 0.5 part of diisopropylbenzene hydroperoxide and 0.2 part of sodium formaldehyde sulfoxylate. The reaction warms to about 60° C., and is then allowed to cool, and stand overnight. A small amount of coagulum is removed. The remaining emulsion is found to contain 91 parts of polymer. By titration, 96% of the 2-methyl-1-vinyl-2-imidazoline has entered into copolymerization. The polymer latex is found to yield a clear, coherent film upon drying, which is a useful protective coating.

Example 16

A solution of 20 parts of styrene, 20 parts of 2-phenyl-1-vinyl-2-imidazoline and 0.2 part of azodiisobutyronitrile is heated under nitrogen for twenty-three hours at 70° C. The product is dissolved in benzene, reprecipitated from petroleum naphtha and washed with diethyl ether. The colorless, brittle polymer has a neutral equivalent of about 1260, indicating a high degree of incorporation of the basic molecule. This, and similar polymers, can be prepared as foamed objects, which can be rapidly and permanently dyed with acidic dyes.

Example 17

A mixture of 20 parts of vinyl acetate, 20 parts of 2-phenyl-1-vinyl-2-imidazoline and 0.2 part of azodiisobutyronitrile is heated in a nitrogen atmosphere at 70° C. for four days. The resulting mixture is dissolved in 160 parts of acetone and the polymer is reprecipitated by adding this solution to 1250 parts of diethyl ether. The solid, light tan polymer has a neutral equivalent of about 440, indicating that about 39 parts of the imidazoline has combined in the polymer with 61 parts of vinyl acetate.

Example 18

A mixture is made of 20 parts of diethyl fumarate, 20 parts of 2-phenyl-1-vinyl-2-imidazoline and 0.2 part of azodiisobutyronitrile. The mixture is heated for twenty-three hours at 70° C. in an atmosphere of nitrogen. Polymerization is very rapid. The hard polymer is purified by solution in benzene and reprecipitation from naphtha. The practically colorless solid, 28 parts, has a neutral equivalent of about 560.

Example 19

A mixture is made of 18 parts of acrylonitrile, 2 parts of 2-ethyl-1-vinyl-2-imidazoline and 0.02 part of azodiisobutyronitrile. The mixture is heated under nitrogen for twenty-four hours at 70° C. The resulting polymeric solid is soluble in dimethyl formamide and can be spun into fibers in the customary manner.

Example 20

A mixture is made of 18 parts of acrylamide, 3 parts of 2-methyl-1-vinyl-2-imidazoline and 0.02 part of azodiisobutyronitrile. The mixture is heated at 60° C. for 24 hours. The product is filtered off and washed with warm ethylene dichloride. It is dried to yield a solid polymer, with neutral equivalent 730.

Example 21

A mixture is made of 20 parts of 2-heptadecyl-1-vinyl-2-imidazoline and 0.02 part of azodiisobutyronitrile. The mixture is heated at 60° C. for 3 days. The resulting polymer is a viscous, waxy oil. It is soluble in heating and lubricating oils, acting to disperse harmful sludges and to protect metal parts against rusting.

Example 22

A mixture is made of 15 parts of cetyl methacrylate and 5 parts of 2-dodecyl-4-methyl-1-vinyl-2-imidazoline. There is added 0.02 part of azodiisobutyronitrile, and the mixture is heated for 24 hours at 70° C. The viscous oil which results is useful as an additive for heating and lubricating oils.

Similar polymers are prepared in this manner, substituting, respectively, 2-heptadecenyl-1-vinyl-2-imidazoline, 2-dodecylphenyl-1-vinyl-2-imidazoline and 2-naphthyl-1-vinyl-2-imidazoline for the 2-dodecyl-4-methyl-1-vinyl-2-imidazoline. All of these polymers show dispersant action in furnace oils.

Example 23

A mixture is made of 15 parts of ethyl acrylate, 5 parts of 2-methyl-1-vinyl-2-imidazoline and 0.01 part of azodiisobutyronitrile. The mixture is heated at 70° for 8 hours. The solid polymer is dissolved in toluene. The toluene solution yields transparent somewhat soft, adherent films, which form an excellent protective surface for metals.

When equivalent parts of isobutyl acrylate or secondary butyl acrylate are substituted for the ethyl acrylate in the above preparation, relatively hard films are obtained which provide excellent protective coatings.

What is claimed is:

A homopolymer of a compound having the formula

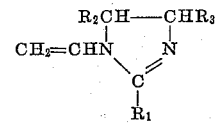

in which $R_1$ is alkyl of up to 18 carbon atoms, $R_2$ is alkyl of up to 17 carbon atoms and $R_3$ is alkyl of up to 17 carbon atoms.

References Cited

UNITED STATES PATENTS

| | | | |
|---|---|---|---|
| 2,540,170 | 2/1951 | Law | 167—43 |
| 2,606,175 | 8/1952 | Price | 260—86.1 |
| 2,836,580 | 5/1958 | Wesp et al. | 260—78.5 |
| 2,868,802 | 1/1959 | Hueni | 260—309.6 |
| 2,875,210 | 2/1959 | Bollenback et al. | 260—309.6 |
| 2,891,025 | 6/1959 | Price | 260—80.5 |
| 2,980,654 | 4/1961 | Perry | 260—78.5 |
| 3,179,668 | 4/1965 | Schickh et al. | 260—309.6 |

JOSEPH L. SCHOFER, *Primary Examiner.*

J. KIGHT III, L. WOLF, L. CHILDERS,
*Assistant Examiners.*